United States Patent
Wang et al.

(10) Patent No.: US 10,595,618 B2
(45) Date of Patent: Mar. 24, 2020

(54) ELECTRONIC DEVICES WITH INPUT-OUTPUT DEVICES

(71) Applicant: Apple Inc., Cupertino, CA (US)

(72) Inventors: Paul X. Wang, Cupertino, CA (US); Christopher T. Lebedeff, Santa Clara, CA (US); Kenneth M. Silz, Brentwood, CA (US)

(73) Assignee: Apple Inc., Cupertino, CA (US)

( * ) Notice: Subject to any disclaimer, the term of this patent is extended or adjusted under 35 U.S.C. 154(b) by 157 days.

(21) Appl. No.: 15/944,577

(22) Filed: Apr. 3, 2018

(65) Prior Publication Data
US 2018/0368559 A1 Dec. 27, 2018

Related U.S. Application Data

(60) Provisional application No. 62/522,973, filed on Jun. 21, 2017.

(51) Int. Cl.
*F21V 23/00* (2015.01)
*A45F 5/00* (2006.01)
(Continued)

(52) U.S. Cl.
CPC ............... *A45F 5/00* (2013.01); *A45C 3/001* (2013.01); *A45C 15/06* (2013.01);
(Continued)

(58) Field of Classification Search
CPC .... A45F 5/00; A45F 2200/0516; A45C 3/001; A45C 15/06; A45C 2011/002; F21V 23/0492; G02B 6/0005; G02B 6/006; G02B 6/0076; G02B 6/0091; G02B 6/0033; G02B 6/0086; G04C 10/04; G04G 17/08; G04G 21/00; G06F 1/163; G06F 1/1635;
(Continued)

(56) References Cited

U.S. PATENT DOCUMENTS 9,292,008 B1 3/2016 Ahamed et al.
9,448,755 B2 * 9/2016 Francis ................. G06F 3/1423
(Continued)

FOREIGN PATENT DOCUMENTS

| CN | 104247383 | 12/2014 |
|---|---|---|
| TW | I547835 | 9/2016 |
| WO | 2015161070 A2 | 10/2015 |

*Primary Examiner* — Laura K Tso
(74) *Attorney, Agent, or Firm* — Treyz Law Group, P.C.; G. Victor Treyz; Joseph F. Guihan

(57) ABSTRACT

An electronic device may have a layer of material with transparent portions. The layer of material may be fabric layer, a layer of leather, or other layer of material. The transparent portions may be formed from openings in the layer of material. The transparent portions may overlap electrical components. The electrical components may include a sensor, light-emitting components, and haptic output components. The light-emitting components may include light-emitting diodes, edge-lit light guides, displays having arrays of pixels, or other light-emitting devices. The openings in the layer of material may be patterned to form icon shapes and other shapes. The layer of material may be used in forming a strap for a wristwatch, a case for a cellular telephone or other portable device, or other electronic device.

26 Claims, 10 Drawing Sheets

(51) Int. Cl.
*G06F 1/16* (2006.01)
*F21V 8/00* (2006.01)
*F21V 23/04* (2006.01)
*G04G 21/00* (2010.01)
*A45C 15/06* (2006.01)
*G04G 17/08* (2006.01)
*H04M 1/725* (2006.01)
*H04B 1/3883* (2015.01)
*G04C 10/04* (2006.01)
*A45C 3/00* (2006.01)
*H04M 1/18* (2006.01)
*H04B 1/3888* (2015.01)
*H04M 1/02* (2006.01)
*G06F 3/044* (2006.01)
*G06F 3/01* (2006.01)
*F21W 111/00* (2006.01)
*A45C 11/00* (2006.01)

(52) U.S. Cl.
CPC ........ *F21V 23/0492* (2013.01); *G02B 6/0005* (2013.01); *G02B 6/006* (2013.01); *G02B 6/0076* (2013.01); *G02B 6/0091* (2013.01); *G04C 10/04* (2013.01); *G04G 17/08* (2013.01); *G04G 21/00* (2013.01); *G06F 1/163* (2013.01); *G06F 1/1635* (2013.01); *G06F 1/1637* (2013.01); *G06F 1/1656* (2013.01); *H04B 1/3883* (2013.01); *H04M 1/185* (2013.01); *H04M 1/72527* (2013.01); *A45C 2011/002* (2013.01); *A45F 2200/0516* (2013.01); *F21W 2111/00* (2013.01); *G02B 6/0033* (2013.01); *G02B 6/0086* (2013.01); *G06F 1/1643* (2013.01); *G06F 3/016* (2013.01); *G06F 3/044* (2013.01); *G06F 2203/04105* (2013.01); *H04B 1/3888* (2013.01); *H04M 1/0202* (2013.01)

(58) Field of Classification Search
CPC .... G06F 1/1637; G06F 1/1656; G06F 1/1643; G06F 3/016; G06F 3/044; G06F 2203/04105; H04B 1/3883; H04B 1/3888; H04M 1/185; H04M 1/72527; H04M 1/0202
USPC ...................... 362/104, 103, 23.09
See application file for complete search history.

(56) References Cited

U.S. PATENT DOCUMENTS

| | | |
|---|---|---|
| 2012/0194976 A1 | 8/2012 | Golko et al. |
| 2013/0106684 A1 | 5/2013 | Weast et al. |
| 2013/0120459 A1 | 5/2013 | Dickinson et al. |
| 2013/0222271 A1 | 8/2013 | Alberth et al. |
| 2015/0312946 A1 | 10/2015 | Chen |
| 2015/0357387 A1 | 12/2015 | Lee et al. |
| 2015/0378391 A1 | 12/2015 | Huitema et al. |
| 2016/0072554 A1 | 3/2016 | Sharma et al. |
| 2016/0290624 A1 | 10/2016 | Dai et al. |
| 2017/0060190 A1 | 3/2017 | Hegde et al. |
| 2018/0064216 A1* | 3/2018 | Tamaki ................... G06F 1/163 |

* cited by examiner

# ELECTRONIC DEVICES WITH INPUT-OUTPUT DEVICES

This patent application claims the benefit of provisional No. 62/522,973, filed on Jun. 21, 2017, which is hereby incorporated by reference herein in its entirety.

FIELD

This relates generally to electronic devices and, more particularly, to input-output devices for electronic devices.

BACKGROUND

It may be desirable to form straps for wristwatches, cases for electronic devices, and other electronic devices from attractive materials such as leather or fabric. In configurations such as these, it may be difficult or impossible to incorporate desired functionality into an electronic device. If care is not taken, device structures that have been selected to implement desired features may make the device unattractive, difficult to use, bulky, or overly complex.

SUMMARY

An electronic device may have a layer of material with transparent portions. The layer of material may be fabric layer, a layer of leather, a polymer layer such as a silicone layer or other elastomeric polymer layer, or other layer of material. The transparent portions may be formed from openings in the layer of material. The transparent portions may overlap electrical components.

The electrical components that are overlapped by the transparent portions of the layer of material may include sensors, light-emitting components, and haptic output components. The light-emitting components may include light-emitting diodes, edge-lit light guides that receive light from light-emitting diodes, displays having arrays of pixels, or other light-emitting devices. The openings in the layer of material may be patterned to form icon shapes and other shapes. Light from the light-emitting components may illuminate the transparent portions. In some configurations, the illuminated transparent portions may serve as status indicators. For example, an illuminated battery charge state icon can serve as an indicator of battery charge status.

Selectable buttons can be formed using illuminated regions that overlap sensors. When a user presses a finger against an illuminated region that overlaps a sensor, control circuitry in the device can use the sensor to detect the presence of the finger. The control circuitry can then take suitable action. The control circuitry can also use a haptic output device to provide the user's finger with tactile feedback to confirm that the finger press has been detected.

The layer of material may be used in forming a strap for a wristwatch, a case for a cellular telephone or other portable device, or other electronic device.

DETAILED DESCRIPTION

Figure 1:
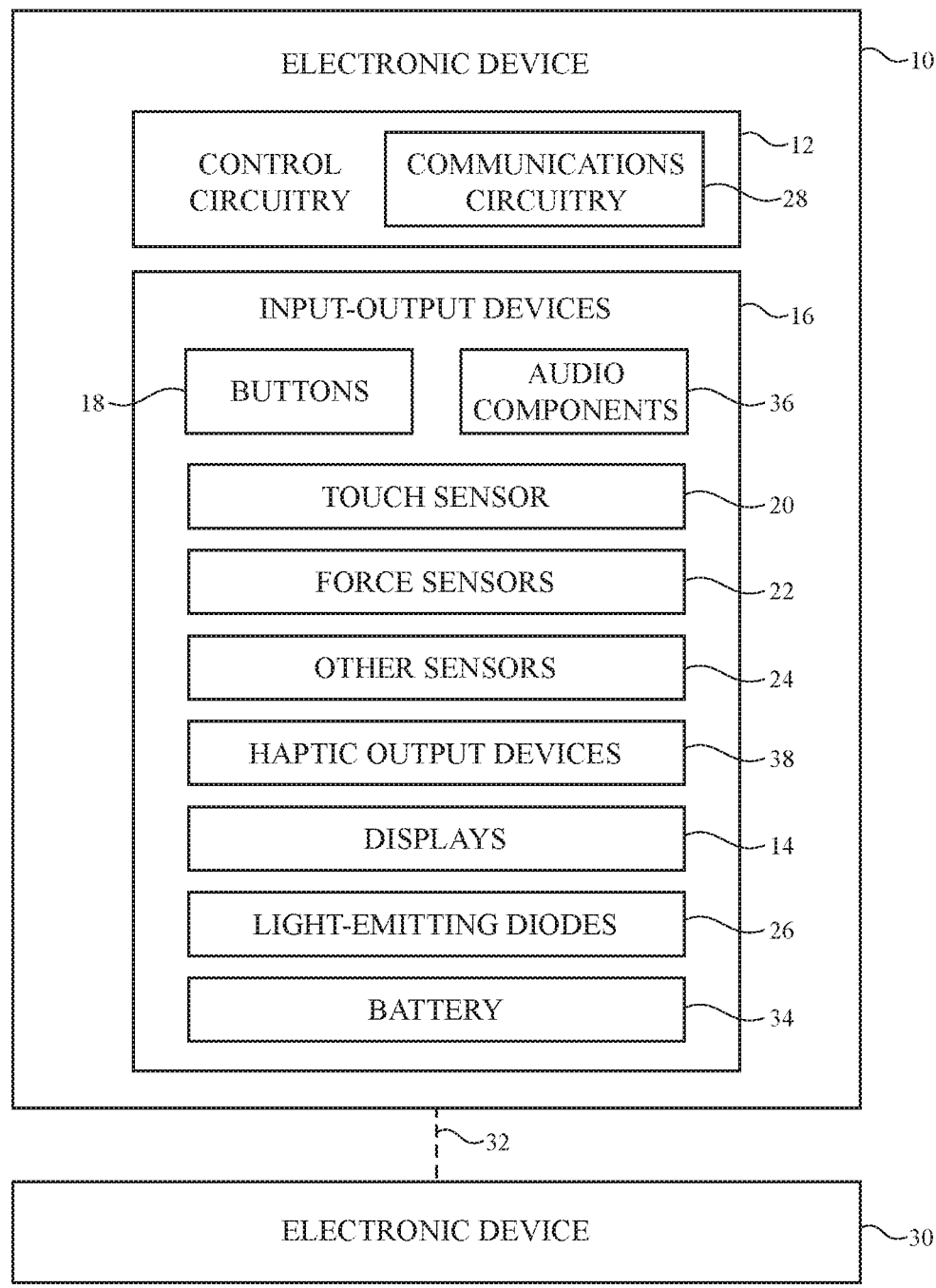
FIG. 1 is a schematic diagram of an illustrative electronic device in accordance with an embodiment.

Items such as electronic device 10 of FIG. 1 may be used to provide a user with visual output. The visual output may, for example, include alerts, icons that convey status information (e.g., battery charge state status, power on/off status, sleep/wake status, volume mute status, etc.), information such as information on the number of unread messages in an inbox, other notification information, information on the current time and date, activity level information, health information, decorative patterns, and/or other visual output. This information may be supplied in the form of text, graphics, still images, video, and/or other content.

Electronic device 10 may be a stand-alone electronic device or may be an accessory that is used with ancillary electronic equipment. For example, device 10 may be an electronic device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation device, a remote control, an embedded system such as a system in which device 10 is mounted in a kiosk, in an automobile, airplane, or other vehicle, other electronic equipment, or equipment that implements the functionality of two or more of these devices. If desired, device 10 may be a removable external case for electronic equipment, may be a strap, may be a wrist band or head band, may be a removable cover for a device, may be a case or bag that has straps or that has other structures to receive and carry electronic equipment and other items, may be a necklace or arm band, may be a wallet, sleeve, pocket, or other structure into which electronic equipment or other items may be inserted, may be part of a chair, sofa, or other seating (e.g., cushions or other seating structures), may be part of an item of clothing or other wearable item (e.g., a hat, belt, wrist band, headband, sock, glove, shirt, pants, etc.), or may be any other suitable item.

Device 10 may have structures such as outer layers (e.g., the outermost layer in a housing), inner layers (e.g., layers that are overlapped by the outermost layer in device 10), and internal support structures that are formed from glass, metal, polymer, ceramic, wood, fabric, natural materials such as leather, and/or other materials. These layers of material may include rigid portions and flexible portions. In some configurations, the outermost layers of device 10 that form external surfaces for device 10 may be formed from flexible material. Flexible outer layers for device 10 may, for example, be formed from flexible material such as fabric, flexible polymer (e.g., elastomeric material such as silicone, which may be bare silicone, silicone colored with a colorant such as dye and/or pigment, and/or painted silicone such as silicone covered with a thin polymer coating containing black particles, white particles, non-neutral-color particles, dyes, or other colorant), flexible materials such as leather and other natural materials, and/or other flexible layers.

Fabric in device 10 may woven fabric, knit fabric, braided fabric, or fabric formed using strands of material formed using other strand intertwining techniques. By selecting materials such as fabric, leather, and/or other materials for the housing of device 10, device 10 may configured to be soft (e.g., device 10 may have a fabric surface that yields to a light touch), may be configured to have a rigid feel (e.g., the surface of device 10 may be formed from a stiff fabric or hard polymer or other material), may be coarse, may be smooth, may have ribs or other patterned textures, and/or may have other configurations.

Device 10 may have control circuitry 12. Control circuitry 12 may be formed from one or more integrated circuits such as microprocessors, microcontrollers, application-specific integrated circuits, digital signal processors, and/or other circuits and may be used to control the operation of electronic device 10 by controlling electrically controllable (electrically adjustable) components in device 10. Control circuitry 12 may use communications circuitry 28 to support communications with one or more devices such as electronic device 30 (e.g., a wristwatch main unit, a cellular telephone or other portable device, wireless earbuds or other audio accessories, etc.). Device 30 may be attached to electronic device 10 (e.g., when device 10 is a strap for a wristwatch and device 30 is the main unit of the wristwatch) or electronic device 10 and electronic device 30 may be separate items that are configured to operate with each other (e.g., when one device is a case and the other is a device that fits within the case, etc.). Circuitry 28 may include antennas and other structures for supporting wireless communications with device 30 over communications link 32. Link 32 may be a wired communications link or may be a wireless communications link.

Device 30 may be an electronic device such as a cellular telephone, computer, or other portable electronic device and device 10 may form a cover, case, bag, or other structure that receives the electronic device in a pocket, an interior cavity, or other portion of device 10. In other situations, device 30 may be a wristwatch device or other electronic device and device 10 may be a strap or other fabric-based item that is attached to device 30 (e.g., device 10 and device 30 may be used together to form a device such as a wristwatch with a strap). In still other situations, device 10 may be an electronic device (e.g., a wearable device such as a wrist device, clothing, etc.) and additional devices such as device 30 may include accessories or other devices that interact with device 10 such as wireless speakers, wireless ear buds, etc. Signal paths formed from conductive yarns and monofilaments (e.g., insulated and bare wires), metal traces on printed circuits, and/or other conductive paths may be used to route signals in device 10 and/or device(s) 30.

Device 10 may include input-output devices 16. Input-output devices 16 may be used to gather input from a user and to make measurements on the operating environment for device 10. Input-output devices 16 may also be used in providing output. The output that is provided may be visual output, audio output, wirelessly transmitted output, and/or other output.

Input-output devices 16 may include buttons 18 (push buttons, rotary buttons, slider buttons, etc.). Touch sensors such as touch sensor 20 may be used to gather touch input (e.g., position information associated with a user touch input, touch gestures, etc.). Touch sensor 20 may be an optical touch sensor, an acoustic touch sensor, a capacitive touch sensor, or other suitable touch sensor.

Force sensors 22 may be used to gather force input from a user. Force sensors 22 may be based on piezoelectric sensors, strain gauges, resistive force sensors, capacitive force sensors and/or other force sensors. Touch sensors such as touch sensor 20 and/or force sensors such as force sensors 22 may, if desired, be implemented using conductive strands in fabric (e.g., conductive strands forming capacitive sensor electrodes in a capacitive touch and/or force sensor).

Other sensors 24 may also be included in input-output device 16 such as gas pressure sensors, particulate sensors, ambient light sensors, optical proximity sensors, optical sensors such as cameras for gathering three-dimensional gesture input, infrared cameras and light sources (e.g., for iris scanning), temperature sensors, sensors for measuring position and/or orientation such as accelerometers, gyroscopes, magnetic sensors (compasses) and/or inertial measurement units that contain multiple orientation sensors and/or position sensors.

Displays 14 may be used for displaying images (e.g., images with text, photographs, graphics, movies, etc.). Displays 14 may be organic light-emitting diode displays, displays having pixel arrays formed from crystalline semiconductor light-emitting diodes, liquid crystal displays, electrophoretic displays, and other displays.

Light-emitting diodes 26 and/or other light-emitting devices that have lower resolution than displays 14 may also be used in creating visual output. For example, light-emitting diodes 26 may directly supply illumination to an icon-shaped pattern of openings in a layer of material in device 10 or may supply illumination to a light guide layer that provides the illumination to an icon-shaped pattern of openings in a layer of material in device 10.

Battery 34 may supply device 10 (and, if desired, devices such as device 30) with battery power.

Audio components 36 may include devices for gathering audio input such as one or more microphones and devices for providing audio output (e.g., speakers, tone generators, etc.).

Haptic output devices 38 may include piezoelectric haptic actuators, haptic actuators based on electroactive polymer devices, electromechanical actuators, and/or other haptic output devices that provide a user with tactile output (vibrations, impulses, etc.).

Figure 2:
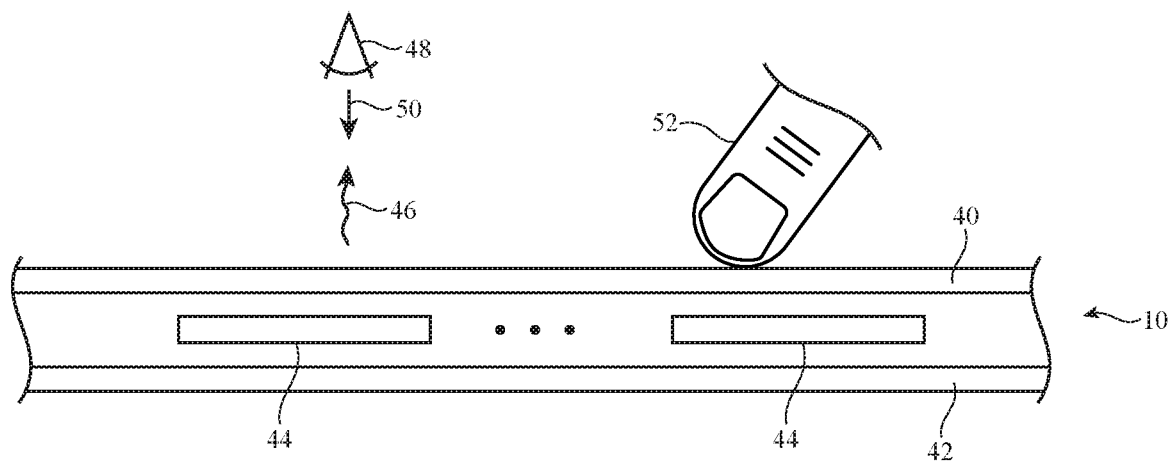
FIG. 2 is a side view of an illustrative electronic device showing how electrical components may operate through an outer layer of the device in accordance with an embodiment.
Figure 3:
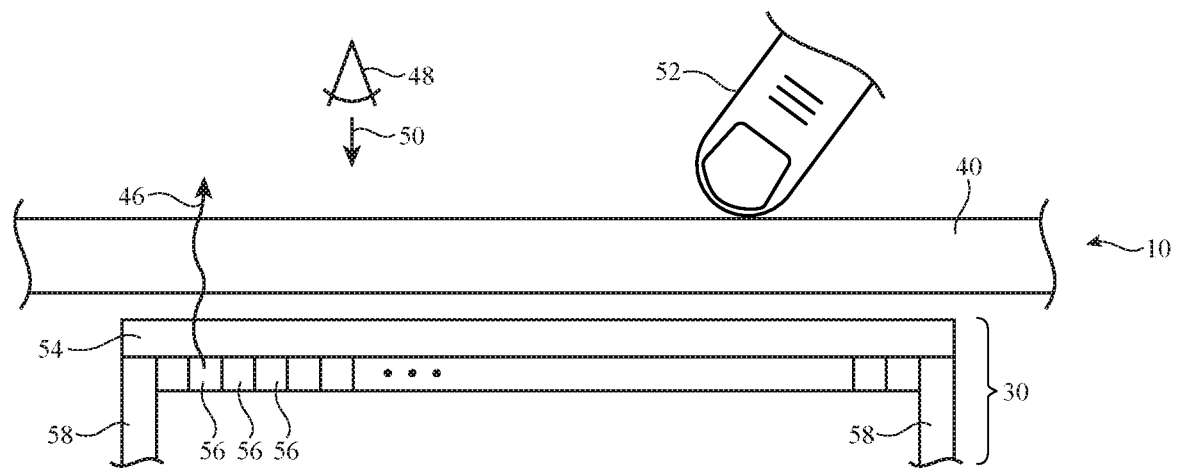
FIG. 3 is a side view of an illustrative electronic device such as a case that is being used in cooperation with another electronic device such as a portable electronic device mounted in the case in accordance with an embodiment.

FIG. 2 is a cross-sectional side view of an illustrative electronic device such as device 10. As shown in FIG. 2, device 10 may include structures that form the outermost layers of device 10 such as layer 40 and 42. These layers, which may sometimes be referred to as housing walls or housing structures, may each include one or more layers of material such as fabric, leather or other natural materials, polymer, metal, glass, ceramic, carbon fiber composites and other fiber composites, other materials, and/or combinations of these materials. In the example of FIG. 3, layer 40 is shown as forming an upper outermost layer for device 10 and layer 42 is shown as forming an opposing lower outermost layer for device 10.

The space between layers 40 and 42, which may sometimes be referred to as the interior of device 10, may include electrical components 44 such as the components of circuitry 12 and input-output devices 16 of FIG. 1. Components 44 may gather input from a user and/or may supply output to a user. As an example, components 44 may form a touch sensor (e.g., a capacitive button, a capacitive sensor that gathers two-dimensional touch input, etc.), a force sensor, an optical sensor (e.g., an optical touch sensor or optical proximity sensor), a camera, a microphone, or other component for gathering user input. Touch or force input may, for example, be received when an external object such as user's finger 52 presses on layer 40. The portion of layer 40 that is pressed on in this way may include light-emitting structures (e.g. to illuminate an icon associated with a button, etc.).

In some configurations, haptic output may be provided by a haptic output device in device 10. For example, components 44 may include one or more haptic output devices that supply a haptic output to user's finger 52 in response to detection of a touch input or force input with finger 52 (e.g., in a portion of layer 40 that contains an illuminated icon and that overlaps a sensor that detects the presence of finger 52).

Visual output may be provided by light-generating components in components 44. Components 44 may, for example, produce light 46 that is visible to a user such as viewer 48 who is viewing layer 40 and device 10 in direction 50. Layer 40 may have one or more transparent regions (e.g., regions that allow at least some of the emitted light from components 44 to pass). These transparent regions allow light 46 to reach viewer 48. Light 46 may be produced by light-emitting devices such as light-emitting diodes that are supplying light 46 directly or through waveguides, may be produced by a display (e.g., a pixel array containing an array of light-emitting diodes or other suitable pixel array), or may be produced by other light-producing components.

In some arrangements, device 30 and device 10 may be used together. For example, device 10 of FIG. 2 may be a wristwatch strap that is coupled to a wristwatch unit with a rigid metal housing or other rigid housing (e.g., device 30 of FIG. 1). As another example, device 10 may be a battery case for a cellular telephone or other portable electronic device (e.g., device 30 of FIG. 1). FIG. 3 is a cross-sectional side view of electronic device 10 in this type of configuration. As shown in FIG. 3, device 30 may have a housing such as housing 58. Housing 58 may be a rigid housing formed from metal, ceramic, glass, rigid polymer, and/or other materials. A light-emitting component such as a display may be mounted in housing 58. The display may include an array of pixels 56 covered by a protective layer such as display cover layer 54. During operation, the display formed by pixels 56 or other light-based component in device 30 may emit light 46 that passes through transparent portions of layer 40. In some configurations, device 10 may also have components such as components 44 of FIG. 3 (touch and/or force sensors, other sensors, haptic output devices, etc.) that are interposed between device 30 and the outer surface of outermost layer 40. Touch sensor circuitry formed in the display of device 30 may also gather touch input from a user. For example, device 30 may have a capacitive touch sensor that overlaps pixels 56 and this capacitive touch sensor may gather touch input from an external object such as finger 52 through layer 40. If desired, haptic output may also be provided from a haptic output device in device 30.

Figure 4:
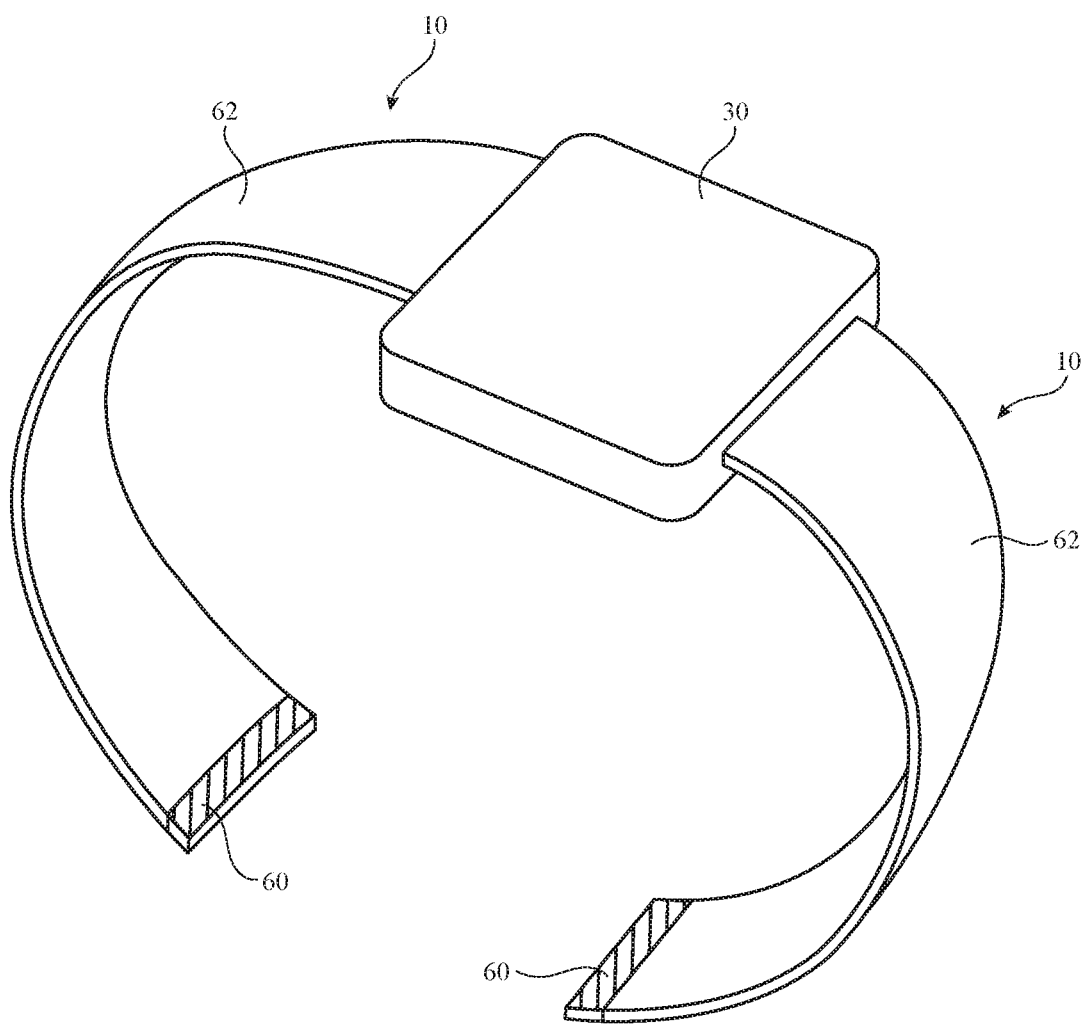
FIG. 4 is a perspective view of an illustrative wristwatch in accordance with an embodiment.

FIG. 4 is a perspective view of device 10 in an illustrative configuration in which device 10 forms a strap for a wristwatch. As shown in FIG. 4, device 10 may be coupled to device 30 (e.g., a touch-enabled wristwatch unit having a touch screen, one or more buttons, wireless circuitry for transmitting and receiving wireless information, and/or other components). As shown in FIG. 4, device 10 may include a clasp such as clasp 60. Clasp 60 may include magnets, interlocking mechanical features, and/or other clasp structures for securing the ends of the strap together. During operation, components 44 (FIG. 2) may gather input through surfaces such as surfaces 62 of device 10 and/or may supply visible output (light 46), haptic output, and other output through surfaces 62 of device 10.

Figure 5:
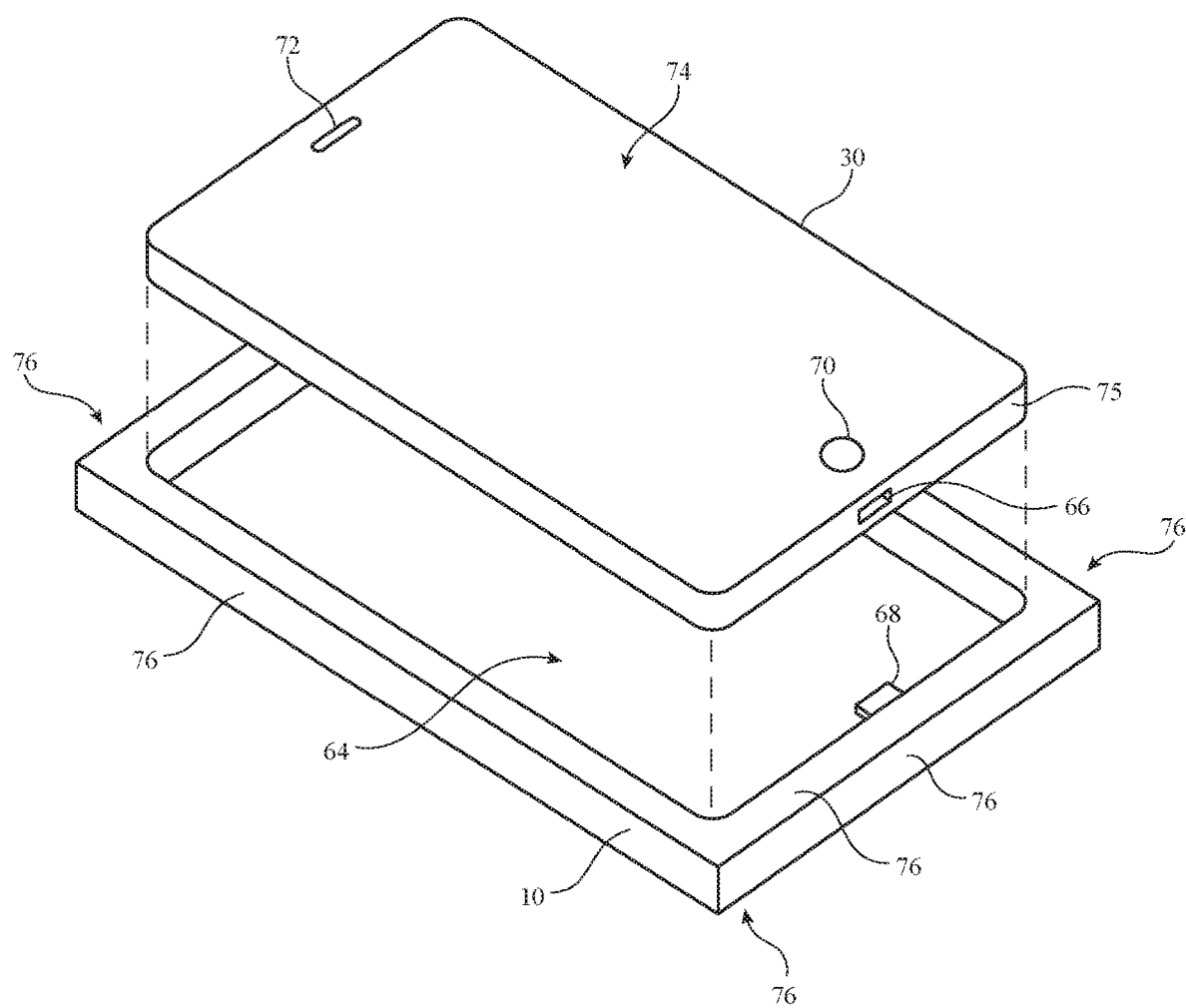
FIG. 5 is a perspective view of an illustrative portable device and associated case in accordance with an embodiment.

FIG. 5 is a perspective view of device 10 in an illustrative configuration in which device 10 forms a case for device 30 (e.g., a cellular telephone, tablet computer, etc.). As shown in FIG. 5, device 10 may have surfaces 76 (e.g., sidewall surfaces and front and rear surfaces) that may overlap components 44. During operation, components 44 may gather touch input through layer 40 in these areas and/or may gather other input through layer 40 in these areas. Components 44 may also supply a user with visual output and/or other output (e.g., haptic output) in these areas. Device 30 may be received within opening 64 of device 10 when it is desired to use device 10 with device 30 (e.g., when using device 10 to protect device 30 and/or to provide supplemental battery power to device 10 from a battery within device 10).

The input that is gathered by sensors through layer 40 may include input to a touch sensor, force sensor, gas sensor, proximity sensor, particulate sensor; temperature sensor, moisture sensor, humidity sensor, optical sensor, capacitive sensor, resistive sensor, ambient light sensor, microphone, camera, or other sensor. The output that is supplied through layer 40 by output devices in components 44 may be visual output (light), audio output (sound), haptic output (vibrations), or other suitable output. Openings, windows, thinned areas, and/or other structures may be formed in layer 40 to facilitate the gathering of input and to facilitate the supply of output through layer 40.

Device 30 may have a display such as display 74 mounted in a housing such as housing 75. Housing 75 may be formed from metal, plastic, glass, ceramic, and/or other materials. In the example of FIG. 5, housing 75 has a rectangular footprint (outline when viewed from above), but other housing shapes may be used for housing 75 of device 30, if desired. Display 74 may be mounted in housing 75 and may present a user with images. Device 30 may have a menu button or other button such as button 70 (e.g., a mechanical button or a virtual button on display 74). Openings may be formed in display 74 to form speaker port 72 for a speaker in device 30 and, if desired, button 70. Openings may also be formed in device 30 to accommodate ports such as illustrative port 66. A connector in port 66 may include data lines that receive signals from external equipment, may include power lines that receive power from device 10, and may couple to a mating connector with signal and/or power lines such as connector 68 in device 30. During operation, connectors in ports 68 and/or 70 may be used to route power from a battery in device 10 to device 30 (or vice versa) and/or may allow data to be exchanged between device 30 and device 10.

In configurations of the type shown in FIG. 5, regions 76 of device 10 may have a layer such as layer 40 that overlaps components 44 (e.g., light-emitting components, etc.). This allows one or more of regions 76 to gather input such as user input and/or environmental measurements and/or to provide haptic output, visual output, and/or other output to a user. In other configurations, layer 40 in one or more regions 76 may overlap components in device 30 so that light 46 or other output that is generated by device 30 can pass through layer 40 to a user and/or so that input supplied by the finger of a user or other object may pass through layer 40 to components in device 30. As an example, if the sidewalls of device 30 contain a portion of a touch screen display (e.g., if display 74 on the front face of device 30 extends partly or fully down the sidewalls on the left and/or right edges of device 30), this touch sensitive display surface may be used to gather touch input through an overlapping layer 40 of device 10 and/or may be used to supply light 46 that passes through an overlapping layer 40 of device 10.

During operation of device 10, exposed regions of device 10 (e.g., exposed regions of layer 40 such as regions 62 of FIG. 5 and regions 76 of device 10 of FIG. 5) may be used to display information that is generated by device 30 (e.g., alerts such as information on incoming messages received by device 30, information on the battery charge state for the battery of device 30, etc.), information related to the operation of device 10 (e.g., information on the battery charge state of the battery in device 10), information such as icons for labeling a button function (e.g., a button implemented with a sensor and haptic output device in device 10), and/or other information. In general, any suitable information may be displayed (e.g., information related to operating system functions, information related to received messages or other status information, message content, time and date information, information on the location of device 10, information on media playback tracks, volume level, information on accessories that are wirelessly coupled to device 10 and/or device 30 such as wireless ear buds, calendar information, emojis associated with messages or other activities handled by device 10, dots or bars that represent activity levels (calories burned, workout progress, etc.), missed call notifications, incoming call notifications, alarm notifications, information on health information gathered with sensors in device 10 and/or device 30, and/or other information.

To allow light 46 to pass through layer 40, layer 40 may be provided with structures that locally and/or globally enhance light transparency. As an example, layer 40 may be provided with openings that allow light 46 to pass through layer 40. These openings in layer 40 may include openings that pass partway through layer 40 such as openings 78 and openings that pass entirely through layer 40 such as through-hole openings 80. For visual consistency, layer 40 may also include partial openings such as openings 82 that create a uniform visual appearance to layer 40 when viewed from the exterior of layer 40, but may not be sufficiently deep to facilitate passage of light 46 through layer 40. The openings in layer 40 may be filled with air, polymer (e.g., translucent polymer or other transparent polymer), or other transparent material to help prevent dust and moisture from entering the openings. If desired, this material may be colored, textured, etc. to help match the visual appearance of the openings to the other portions of layer 40. The openings in layer 40 may be 40-60 microns in diameter, at least 20 microns in diameter, less than 100 microns in diameter, or other suitable size. Openings such as these may be invisible to the naked eye, so that the openings will not be noticeable on casual inspection of the surface of layer 40. Openings may be spaced apart by 200-300 microns (e.g., in leather), by 100-120 microns (e.g., in fabric), may have other suitable spacing values (e.g., at least 20 microns, at least 80 microns, at least 400 microns, less than 500 microns, less than 250 microns, etc.).

Figure 7:
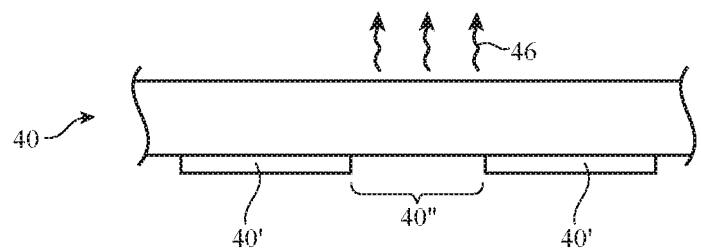
FIG. 7 is a cross-sectional side view of an illustrative layer of material for an electronic device in which the layer of material has been coated with a patterned coating in accordance with an embodiment.

FIG. 7 shows how layer 40 may be provided with a patterned coating layer such as coating 40'. Coating 40' may be formed from an opaque masking layer such as a layer of black ink (e.g., polymer containing black dye or pigment), may be formed from a polymer layer containing dyes and/or pigments of other colors, may be formed from a metal layer, and/or may be formed from other coating materials. In some configurations, coating 40' may be sufficiently opaque to block light 46. To create transparent regions in layer 40, coating layer 40' may have one or more openings such as opening 40" (e.g., solid openings shaped to form icons, arrays of openings that collectively form icons, etc.).

Figure 6:
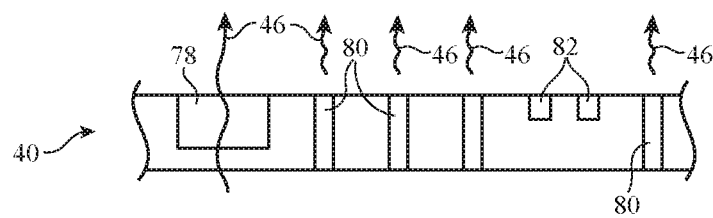
FIG. 6 is a cross-sectional side view of an illustrative layer of material for an electronic device in which the layer of material has openings in accordance with an embodiment.
Figure 8:
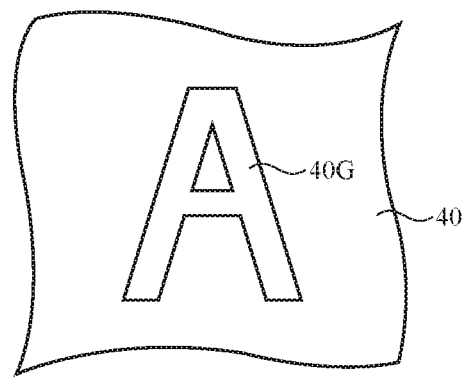
FIG. 8 is a diagram of an illustrative region of an electronic device that is displaying illuminated text through the outermost layer of the device in accordance with an embodiment.
Figure 9:
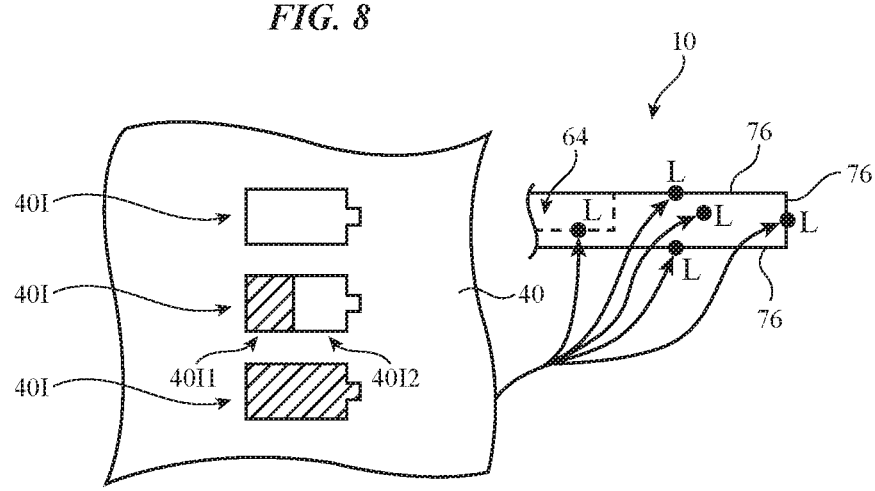
FIG. 9 is a diagram of an illustrative region of an electronic device that is displaying an illuminated battery charge state icon through the outermost layer of the device in accordance with an embodiment.

The openings of layer 40 (e.g., perforations or other openings in layer 40 and/or coating layer openings) may be patterned to form any suitable type of visual image when illumination passes through the openings. In some configurations, the openings in layer 40 may include a general-purpose array of perforations (e.g., a rectangular array having rows and columns of through-hole openings or other transparent openings). In other configurations, some of the openings may be shallow openings such as openings 82 of FIG. 6 and/or openings that have been at least partly filled or covered by opaque masking material and other openings may be transparent. The transparent openings may be patterned to form a symbol (glyph) such as the illustrative alphanumeric character (character 40G) in layer 40 of FIG. 8. Arrangements in which only openings 80 are present and are patterned in a desired pattern such as a character 40G of FIG. 8 may also be used. As shown in FIG. 9, the transparent regions of layer 40 (e.g., the openings in layer 40) may be patterned to form icons such as icons 40I. Icons 40I may include, for example, battery charge state indicator icons, icons associated with a selectable button (e.g., a button formed from a touch sensor, light-emitting device, and haptic output device that overlap the icon) such as an icon that serves as a control button label for a button that is used in answering phone calls, icons associated with button functions such as muting and unmuting audio, symbols associated with buttons controlling media playback functions, or other suitable icons. The cross-sectional side view of the portion of device 10 that is shown on the right of FIG. 9 shows optional locations L in opening 64 and on top, side, end, and bottom surfaces 76 where icons 40I may be located.

In some configurations, icons may supply status information and may not be selectable (e.g., a battery charge state icon may supply information on battery charge state). In other configurations, icons may be selectable. For example, a mute icon may be overlapped by a sensor such as a capacitive touch sensor. When a user desires to mute audio, the user may press on the mute icon. The capacitive touch sensor may detect when the mute icon has been selected in this way. If desired, a haptic output device may be overlapped by the mute icon or other selectable icon to provide a user with tactile feedback confirming when the icon has been selected. Mute functions, audio track playback functions, and/or other functions associated with selectable icons on device 10 may be used in controlling media playback on device 10, a paired set of earbuds, a paired set of wireless speakers, and/or other device 30.

Colored light-emitting diodes or other light-emitting components may be used to provide illumination. In some arrangements, the light-emitting components form a display that can display images. In other arrangements, the light-emitting components include a relatively small number of light-emitting diodes that are used in forming illumination for patterned openings such as alphanumeric character 40G of FIG. 8, icons 40I of FIG. 9, and/or other patterned transparent areas. Light-emitting diodes can have different colors. Different light-emitting diodes may also be used to provide illumination 46 to different portions of the openings in layer 40. For example, a first portion of an icon such as icon portion 40I1 can be illuminated with light 46 from a first light-emitting diode an a second portion of this icon such as portion 40I2 can be illuminate with light 46 from a second light-emitting diode. With this type of arrangement, the entire icon can be illuminated in one mode of operation (e.g., when the battery is full), half of the icon can be illuminated in another mode (e.g., when the battery is partially depleted), and light 46 to the icon can be turned off in a mode of operation in which the battery is fully depleted (as an example).

Figure 10:
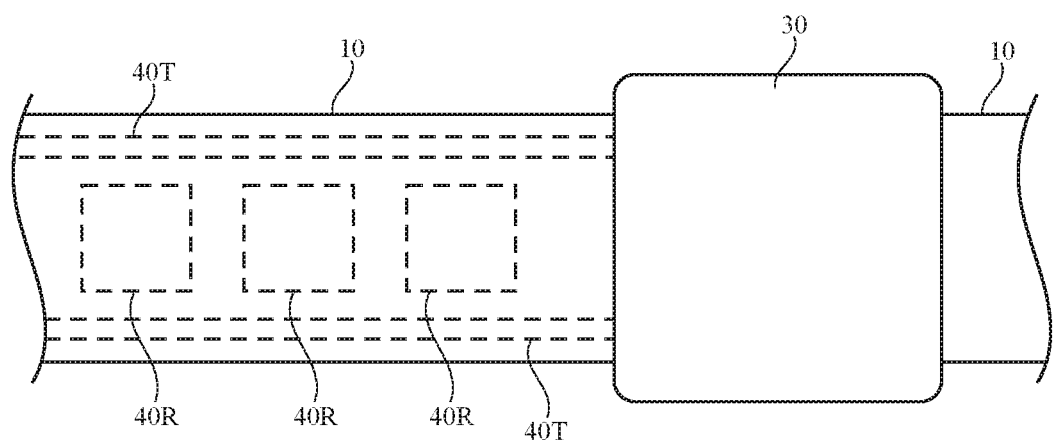
FIG. 10 is a diagram of an illustrative wristwatch having a strap that is displaying an illuminated trim pattern and additional illuminated content in accordance with an embodiment.

FIG. 10 shows how device 10 may have transparent regions in layer 40 such as regions 40T that serve as decorative trim and/or that convey information to a user. Regions 40T may be illuminated at all times, may normally be off, may be flashed on and off to convey information to a user, may be illuminated upon receipt of a message or upon occurrence of other events, may change color for aesthetic reasons and/or to convey information, and/or may otherwise be adjusted by control circuitry 12 during operation of device 10. Regions 40R may contain displays (e.g., one or more displays with pixel arrays for displaying images), may contain transparent areas patterned to form trim, symbols, characters, and/or other content. Two-dimensional touch sensors such as transparent capacitive touch sensors or other sensors may be overlapped by regions 40R (e.g., regions 40R may serve as touch sensitive display regions).

In general, alphanumeric characters (text), icons, Icons in regions such as regions 62 and 76 can be used to display any suitable type of information (battery status for device 10 and/or battery status for device 30, still and/or moving image with text, graphics, photographs, video, etc.).

Figure 11:
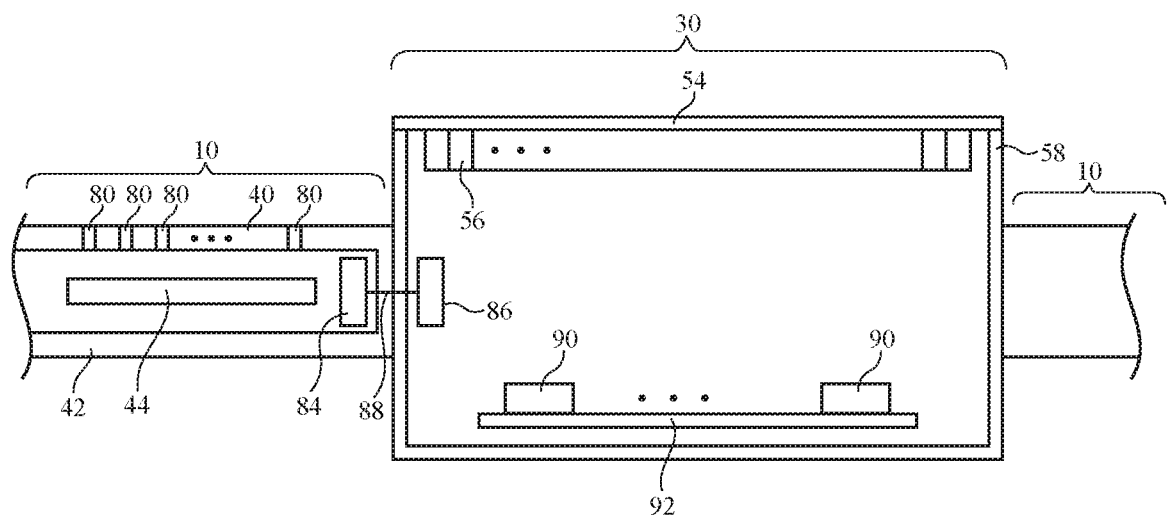
FIG. 11 is a cross-sectional side view of an illustrative wristwatch having a strap coupled to a wristwatch unit with a display in accordance with an embodiment.

FIG. 11 is a cross-sectional side view of device 10 and device 30 in an illustrative configuration in which device 30 is a wristwatch device and device 10 is a strap that is coupled to device 30. As shown in FIG. 11, device 30 may include a housing such as housing 58 in which a display formed from an array of pixels 56 and a transparent display cover layer have been formed. Electrical components 90 (e.g., control circuitry, input-output devices, a battery, etc.) may be coupled to printed circuits and other substrates such as substrate 92 in the interior of housing 58. Communications circuitry 86 in device 30 may be used to communicate with corresponding communications circuitry 84 in device 10 over a wired or wireless link such as link 88. Device 10 may include openings such as openings 80 or other structures that create transparent regions in layer 40. Components 44 may be formed in the interior of device 10 between outermost layers 40 and 42. Components 44 may be overlapped by layer 40 so that components 44 may gather input through layer 40 (e.g., environmental measurements, user input such as touch and/or force input, etc.) and/or may supply illumination 46 and other output such as audio output, haptic output, etc. through layer 40. Openings such as openings 80 and/or other openings in device 10 may be used to allow gas (e.g., ambient air) and light (e.g., ambient light) to pass to sensors in components 44 (e.g., to allow monitoring of gas concentrations, particulate counts, temperature, humidity, and/or other environmental parameters).

Figure 12:
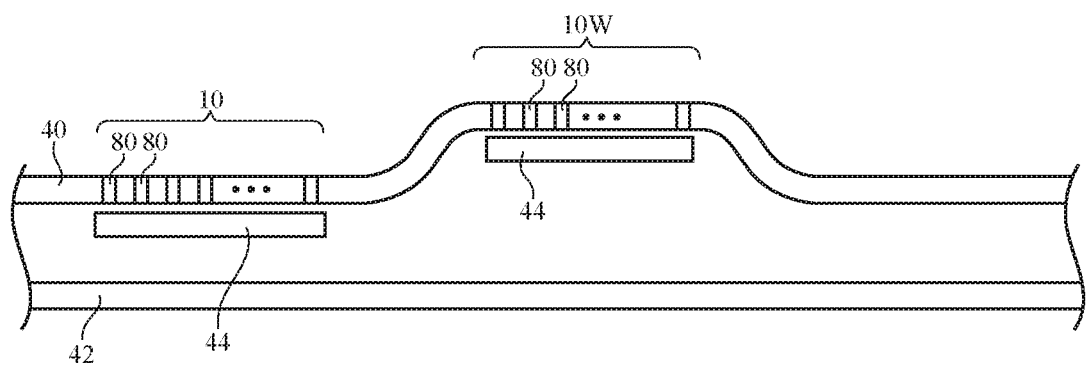
FIG. 12 is a cross-sectional side view of an illustrative wristwatch with an integrated strap covered with a flexible layer through which illuminated content is displayed in accordance with an embodiment.

In the illustrative arrangement of FIG. 12, layer 40 covers a portion of device 10 that forms a strap (device 10) and portion 10W (e.g., to form a watch face). In the strap portion of device 10, components 44 may display icons, text, etc. through openings 80 or other transparent regions in layer 40. In watch unit portion 10W, component 44 (e.g., a display) may be used to display watch hands, digital time and/or date digits, and/or other information. The arrangement of FIG. 12 presents a uniform outward appearance to the user of device 10 because layer 40 covers both the central watch unit portion of the device and the flexible strap portions of the device. The watch unit portion (10W) of device 10 may be rigid (e.g., using internal supports that are rigid) or may be flexible (e.g., when device 10 is a flexible band).

Figure 13:
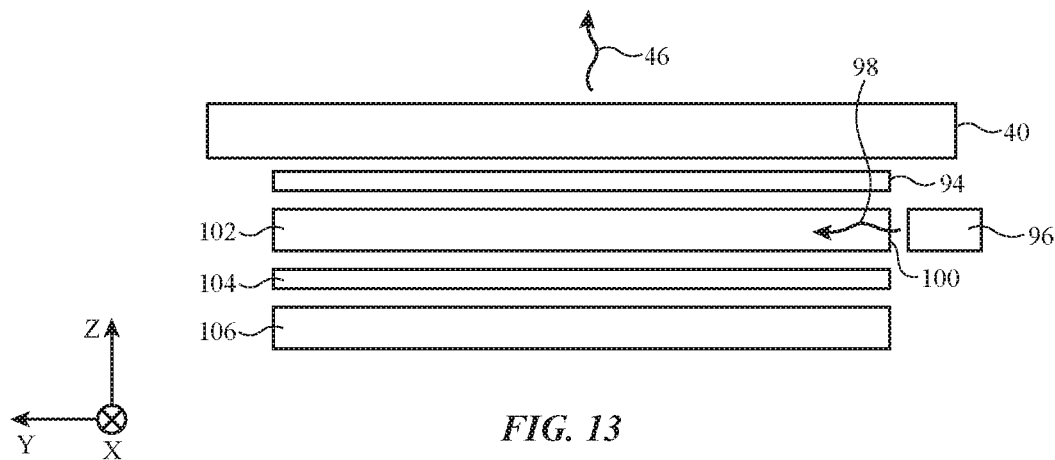
FIG. 13 is a cross-sectional side view of illustrative structures for displaying illuminated content in an electronic device such as an interactive icon using an edge-lit light guide layer that overlaps a sensor and that overlaps a haptic output device in accordance with an embodiment.

As shown in FIG. 13, openings or other transparent areas in layer 40 may be illuminated using edge-lit light guide structures such as light-guide layer 102 (e.g., a clear polymer layer). One or more light-emitting diodes 96 of one or more different colors may emit light 98 into edge 100 of light guide layer 102. This light is distributed laterally (in the XY plane of FIG. 13) due to the principal of total internal reflection. Light scattering features such as recesses and protrusions may be used to scatter light 98 upwards as illumination 46. Reflector 104 (e.g., a layer of white plastic, a thin-film mirror, or other reflective material) may be used to reflect light that has scattered out of light guide layer 102 in the downwards (−Z) direction back in the upwards (+Z) direction. Transparent components such as component 94 may be interposed between light guide layer 102 and layer 40. Component 94 may be, for example, a transparent capacitive touch sensor formed from an array of indium tin oxide electrodes or other transparent capacitive touch sensor electrodes on a layer of transparent polymer or other clear dielectric, a transparent force sensor, etc. Haptic output devices or other components 106 may be overlapped by light guide layer 102 (e.g., to provide haptic output through layer 40 when a touch input from a user is detected by a touch sensor or when other user input is detected with component 94).

If desired, a segmented light guide (e.g., a light guide layer formed from multiple independent smaller light guide layers 102 each with a set of one or more independently adjustable light-emitting diodes) may be used to illuminate one or more openings (e.g., a light-emitting component for device 10 may have multiple light guide layer portions arranged to form a bar-type indicator in which the number of bars indicated represents a battery level or other information). For example, multiple light guide layers 102 may be formed in a one-dimensional strip or a two-dimensional array of light guide layers 102 may be formed (e.g., to form a two-dimensional matrix of backlit light guide layers 102 with individually adjustable intensities).

In addition to or instead of forming optical waveguides form planar layers of material, optical waveguides such as light guide layers 102 may be formed from bundles of one or more optical fiber waveguides or optical waveguides in other potentially non-planar shapes (e.g., the waveguide of layer 102 may be formed from a cylindrical transparent structure such as an optical fiber). Optical fibers and/or other waveguides may be used to route light to overlapping openings 80 (e.g., one or more optical fibers that receive light from one or more corresponding light-emitting diodes 96 can be mounted within device 10 to overlap one or more openings 80 and can be globally controlled to provide the same illumination to multiple openings 80 and/or individually controlled to provide individually adjustable amounts of illumination to each of multiple openings 80).

Figure 14:
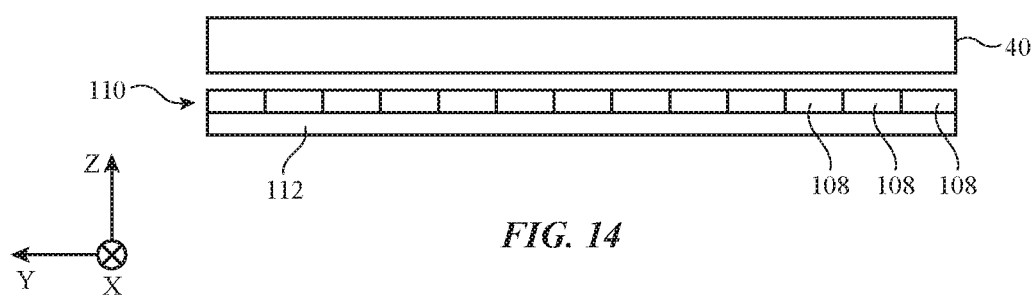
FIG. 14 is a cross-sectional side view of an illustrative pixel array covered by a layer of material in an electronic device in accordance with an embodiment.

In the example of FIG. 14, a display has been formed under layer 40. The display has a substrate such as substrate 112 and pixel structures on substrate 112 that form pixel array 110. Pixel array 110 may include pixels 108 such as organic light-emitting diode pixels, pixels formed from crystalline semiconductor dies forming light-emitting diodes, liquid crystal display pixels (e.g., backlit display pixels), electrophoretic display pixels, or other pixels. Liquid crystal components that exhibit electrically controllable reflectivity and/or other electrically controllable devices that exhibit adjustable color, light transmission, reflectivity, and/or other optical properties may, if desired, used in addition to or instead of using components such as pixel array 110 of FIG. 14. As described in connection with the example of FIG. 13, a sensor such as a transparent capacitive touch sensor or other sensor may, if desired, be interposed between pixel array 110 and layer 40 (e.g., between the perforations or other transparent regions in layer 40 and pixel array 110) and a haptic output device can be overlapped by pixel array 110 and substrate 112.

Figure 15:
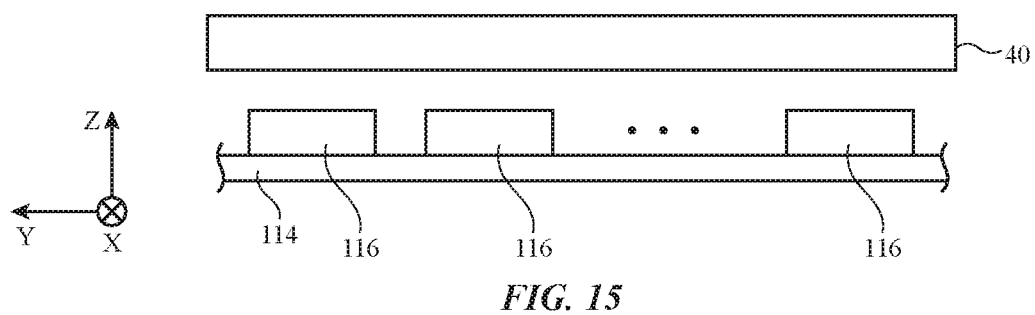
FIG. 15 is a cross-sectional side view of an illustrative electronic device having components such as light-emitting diodes overlapped by a layer of material in accordance with an embodiment.

As shown in FIG. 15, components 116 mounted on substrate 114 may be placed under layer 40. Components 116 may be light-emitting diodes that emit light upwards to illuminate transparent regions in layer 40 (e.g., openings in layer 40). Components 116 and/or components such as light-emitting diode 96 of FIG. 13 may be individually controlled to turn on and off icons and/or other patterned transparent regions in layer 40, to change the color and/or light intensity of patterned transparent regions in layer 40, and/or to otherwise change the appearance of device 10. As described in connection with the example of FIG. 13, a sensor such as a transparent capacitive touch sensor or other sensor may, if desired, be interposed between components 116 and layer 40 (e.g., between the perforations or other transparent regions in layer 40 and components 116) and a haptic output device can be overlapped by components 116 and substrate 114.

Figure 16:
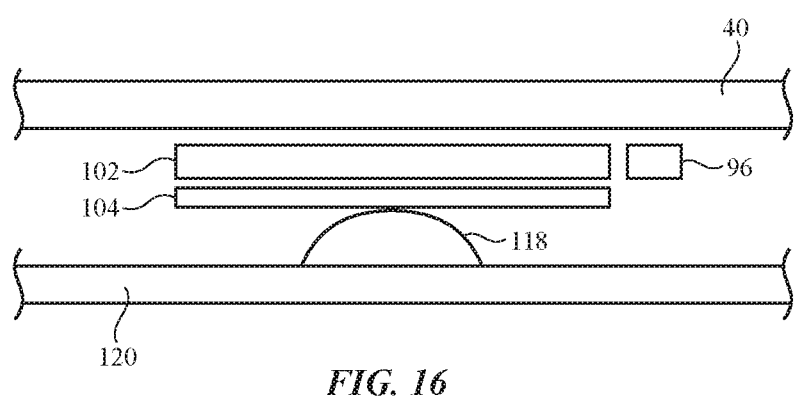
FIG. 16 is a cross-sectional side view of an illustrative electronic device having a light-emitting component overlapping a switch such as a dome switch in accordance with an embodiment.

If desired, transparent regions of layer 40 (e.g., regions with openings) may overlap mechanical components such as dome switch 118 of FIG. 16. Switches such as switch 118 may be mounted to substrates such as printed circuit 120. Light-emitting diodes, displays, or other light-emitting components may overlap switches such as switch 118. In the example of FIG. 16, light guide 102 and reflector 104 overlap dome switch 118. Light-emitting diodes such as light-emitting diode 96 may provide light to light guide layer 102 that is scattered upwardly through openings in layer 40 (e.g., to illuminate an icon or other patterned transparent region in layer 40).

Inertial measurement units (e.g., accelerometers, compasses, and/or gyroscopes and/or other orientation sensors) can be used in determining the orientation of device 10 (e.g., the orientation of device 10 relative to the Earth). Orientation information and/or other sensor information or information received by control circuitry 12 wirelessly or from other sources may be used in controlling visible output in device 10. As an example, orientation information may be use in selecting which region or regions of layer 40 in device 10 should be used in displaying illuminated content to a user (e.g., an incoming message notification, a notification related to an incoming telephone call or other event, calendar information, time and date information, alarm information, reminders, etc.).

Figure 17:
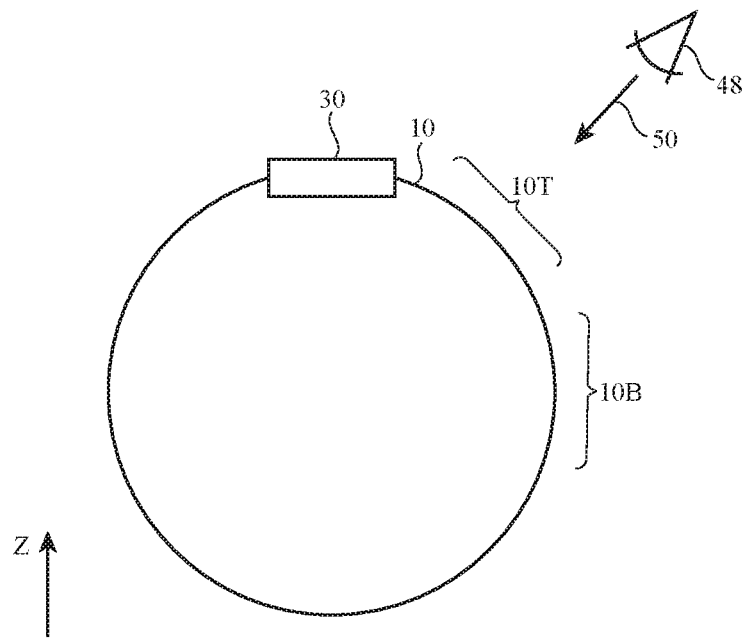
FIGS. 17 and 18 are side views of illustrative electronic devices in two illustrative orientations relative to the Earth in accordance with an embodiment.
Figure 18:
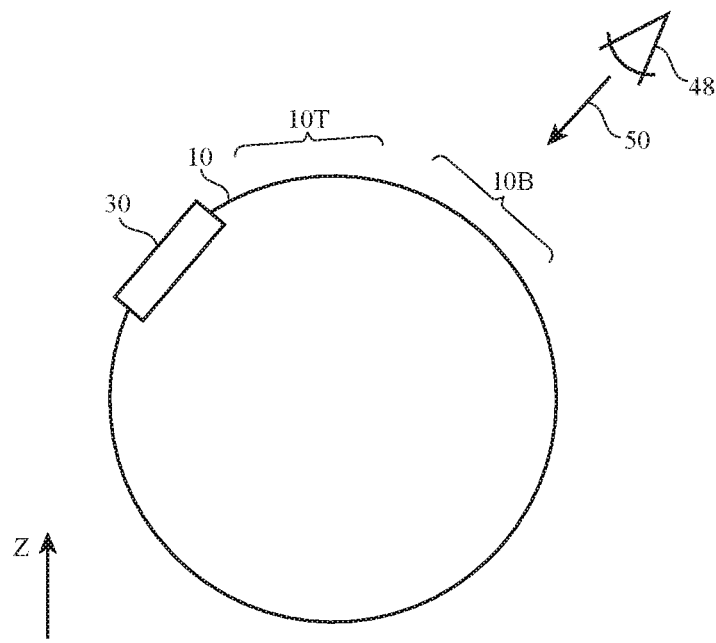

Consider, as an example, the scenario of FIGS. 17 and 18. In the arrangement of FIG. 17, a wristwatch is oriented upwards (e.g., main unit 30 is facing upwards). In this orientation, device 10, which is a strap for unit 30, is oriented so that region 10T is more visible to a user than region 10B. In this mode of operation, control circuitry 12 can use information on the orientation of device 10 to display content (icons, text, moving and still images, notifications, etc.) in region 10T but not in region 10B. In response to measuring a change in orientation of device 10 and device 30 to a tilted orientation of the type shown in FIG. 18 in which user 48 can view region 10B more easily than region 10T, control circuitry 12 can display the same content or other content in region 10B instead of region 10T. In this way, illuminated icons and other information can be displayed for a user in portions of device 10 that are most visible to the user.

The foregoing is merely illustrative and various modifications can be made to the described embodiments. The foregoing embodiments may be implemented individually or in any combination.

What is claimed is:

1. A removable case configured to receive a portable electronic device having a display with edges, comprising:
   a battery configured to supply power to the portable electronic device when the portable electronic device is received in the case;
   a housing having an outer layer of material with a transparent portion formed from perforations in the outer layer of material; and
   a light-emitting component that is overlapped by the outer layer of material and that is configured to emit light through the transparent portion.

2. The removable case defined in claim 1 wherein the portable electronic device comprises a cellular telephone having a cellular telephone connector and wherein the removable case comprises a case connector configured to mate with the cellular telephone connector, wherein the outer layer of material comprises a fabric layer in which the perforations are formed, wherein the light-emitting component includes an edge-lit light guide, and wherein the perforations are configured to form an icon pattern.

3. The removable case defined in claim 2 wherein the perforations are configured to form a battery charge status icon.

4. The removable case defined in claim 1 wherein the light-emitting component includes a light guide layer having an edge and includes a light-emitting diode configured to emit light into the edge.

5. The removable case defined in claim 4 further comprising a touch sensor that is interposed between the light guide layer and the perforations.

6. The removable case defined in claim 5 further comprising a haptic output device, wherein the light guide layer is interposed between the touch sensor and the haptic output device.

7. The removable case defined in claim 6 wherein the outer layer of material comprises an outer layer of material selected from the group consisting of: an outer leather layer and an outer fabric layer.

8. The removable case defined in claim 1 wherein the light-emitting component comprises a display having an array of pixels.

9. The removable case defined in claim 8 further comprising:
a two-dimensional touch sensor interposed between the array of pixels and the perforations.

10. The removable case defined in claim 1 wherein the light-emitting component comprises a light-emitting diode and wherein the perforations are patterned to form an icon.

11. The removable case defined in claim 10 further comprising:
a sensor interposed between the light-emitting diode and the perforations; and
a haptic output device, wherein the light-emitting diode is interposed between the sensor and the haptic output device.

12. The removable case defined in claim 1 wherein the light-emitting component includes multiple light guide layer portions each having a respective edge and each having a respective light-emitting diode configured to emit light into the edge and wherein the light-emitting diodes are individually adjustable.

13. The removable case defined in claim 1 wherein the outer layer of material comprises a polymer layer.

14. The removable case defined in claim 13 wherein the outer layer of material comprises a layer selected from the group consisting of: a silicone layer containing colorant and painted silicone.

15. A wristwatch strap comprising:
a flexible outer layer that has first and second perforations that respectively form first and second transparent regions;
first and second light-emitting components under the first and second respective transparent regions of the flexible outer layer, wherein the first and second light-emitting components include first and second respective light guide layers that each receive light from a respective light-emitting diode through a respective edge that is perpendicular to the flexible outer layer;
an orientation sensor configured to gather orientation information indicative of an orientation of the flexible outer layer; and
control circuitry configured to output light with a selected one of the first and second light-emitting components based on the orientation information.

16. The wristwatch strap defined in claim 15 wherein the flexible outer layer comprises fabric.

17. The wristwatch strap defined in claim 15 wherein the flexible outer layer comprises leather.

18. The wristwatch strap defined in claim 15 wherein the orientation sensor comprises an accelerometer.

19. The wristwatch strap defined in claim 15 wherein the orientation sensor comprises a compass.

20. The wristwatch strap defined in claim 15 wherein the first light-emitting component includes an optical fiber.

21. A device, comprising:
a flexible layer having perforations patterned to form a transparent region having an icon shape;
a light-emitting component configured to supply illumination to the transparent region;
a sensor interposed between the transparent region and the light-emitting component; and
a haptic output device overlapped by the light-emitting component.

22. The device defined in claim 21 wherein the light-emitting component comprises a light-emitting diode and a light guide layer having an edge configured to receive light from the light-emitting diode and wherein the flexible layer comprises a flexible layer selected from the group consisting of: a fabric layer and a leather layer.

23. The device defined in claim 22 wherein the flexible layer is configured to form a strap for a wristwatch that has a wristwatch unit with a display, the device further comprising communications circuitry configured to communicate with the wristwatch unit.

24. The device defined in claim 23 further comprising:
an orientation sensor; and
control circuitry that gathers orientation information from the orientation sensor, wherein the control circuitry is configured to adjust the light-emitting component based on the orientation information.

25. The device defined in claim 21 wherein the light-emitting component comprises a light-emitting diode and wherein the perforations have diameters of less than 100 microns.

26. The device defined in claim 21, wherein the sensor comprises a transparent capacitive touch sensor formed from an array of electrodes.

* * * * *